United States Patent [19]
Cornils

[11] Patent Number: 6,113,727
[45] Date of Patent: Sep. 5, 2000

[54] PROCESS FOR PRODUCING A GLAZING PROVIDED WITH AN EXTRUDED SPACER

[75] Inventor: Gerd Cornils, Merzenich, Germany

[73] Assignee: Saint Gobain Vitrage International, Courbevoie, France

[21] Appl. No.: 08/659,594

[22] Filed: Jun. 6, 1996

[30] Foreign Application Priority Data

Jun. 9, 1995 [FR] France ................................. 95 06830

[51] Int. Cl.[7] .......................... B29C 47/00; B29C 47/02; B32B 31/12; B32B 31/30
[52] U.S. Cl. ............... 156/244.18; 156/108; 156/244.11; 156/258; 156/267; 156/289; 156/500; 156/537; 264/161; 264/252; 425/113
[58] Field of Search ............... 156/108, 244.11, 156/244.18, 244.19, 256, 258, 267, 289, 500, 510, 537; 264/161, 252; 425/113

[56] References Cited

U.S. PATENT DOCUMENTS

| | | | |
|---|---|---|---|
| 5,242,518 | 9/1993 | Riederer | 156/108 X |
| 5,632,939 | 5/1997 | Ito et al. | 264/252 X |

*Primary Examiner*—Adrienne C. Johnstone
*Attorney, Agent, or Firm*—Pennie & Edmonds LLP

[57] ABSTRACT

A method and apparatus for extruding a plastic spacer directly on an object, in particular on the periphery of window glazing, such as automobile glazing intended to be glued into the opening of a vehicle. In particular the invention relates to properly producing the connection zone between the end and the beginning of the extruded spacer when it forms a closed loop. According to the invention the beginning of the spacer and the remainder of the loop are extruded, with the exception of the connection zone. The object is then provided with an applied anti-adhesive deposit surface that is continuous with the surface of the object. The path of the extrusion head is diverted in relation to the surface of the object so that the extrusion occurs on the applied deposit surface, proximate to and beyond the beginning of the spacer loop. The extruded spacer is then allowed to harden and the extremities of the spacer are cut and adjusted to properly complete the connection. After extrusion, the applied deposit surface may be eliminated or neutralized and the spacer, whose path was diverted on the surface of the object, is glued in position to complete the connection zone.

17 Claims, 1 Drawing Sheet

PROCESS FOR PRODUCING A GLAZING PROVIDED WITH AN EXTRUDED SPACER

BACKGROUND OF THE INVENTION

The invention relates to the methods of extruding a plastic spacer directly on an object, in particular on the periphery of a window glazing such as an automobile glazing intended to be glued into the opening of a vehicle. It relates more specifically to the operations of finishing a spacer in a loop, i.e., when the extrusion of the spacer ends on the object in the place where it began. It is particularly exacting to produce properly the connection zone between the end and the beginning of the extruded spacer. The invention proposes a new method to complete this connection.

The method of depositing an elastomer frame on a glazing by means of extrusion has been described before, particularly in U.S. Pat. Nos. 4,571,278 and 5,336,349. They show an extrusion head that is relatively moved in relation to the glazing, where it deposits a viscous material that hardens after it is deposited. Another patent, EP-A-493068, shows a method where the extrusion head is fixed and the glazing is moved in front of it.

One exacting aspect of the method of in situ extrusion on the periphery of glazing is the final phase in cases where the frame is closed, i.e., when the spacer that is deposited on the glazing makes a loop. In the connection zone, the end of the extruded spacer must meet up with the beginning of the same spacer to close the loop. If no technical measures are taken, the connection zone will be misshaped. When tolerances are precise or if the elastomer spacer is visible on the installed glazing, it is impossible to leave the connection unchanged.

Three different methods have been proposed to solve this problem. The first method is described in U.S. Pat. No. 5,057,265 and it corrects the form of the connection immediately after it has been formed, while the elastomeric material is still viscous and malleable. The two other methods substitute an object of the correct form for the misshapen spacer that has already hardened. Of those two aforementioned methods, the one mentioned in EP-A 493 068 substitutes for the poorly-formed spacer a hardened product that has been extruded elsewhere by a traditional method. This separately-formed hardened product is then glued to the glazing to complete the loop. The last method described in document EP-A-524 060 proposes substituting for the poorly-formed spacer a spacer that is hardened in place. This present invention comprises an improved variation of that method.

U.S. Pat. No. 5,316,829 suggests removing the poorly-formed part and then placing on the zone concerned a mold element that connects the two sides of the properly-shaped spacer and injecting a material that hardens in place and recreates the spacer in the place where the poorly-formed part was removed. The disadvantage of the latter method is that it requires re-work of the glazing after it has left the extrusion station so that it can undergo a new production phase, i.e., the injection of the new material. This complicates and delays the production of the completed glazing.

The technical problem that the invention is intended to overcome is, in contrast to the three preceding methods, that most of the operation of correcting the connection zone can be done at the time of extrusion.

SUMMARY OF THE INVENTION

The invention proposes a process for finishing the extrusion deposit of a plastic spacer directly on an object in which an extrusion head that moves relative to the surface of the object deposits on it a spacer in the form of a loop, comprising the following steps:

a. The beginning of the spacer and the remainder of the loop are extruded, with the exception of the connection zone.

b. The object is provided with an applied anti-adhesive deposit surface that is continuous with the surface where the previous extrusion has been placed.

c. The path of the extrusion head is diverted in relation to the surface of the object so that the extrusion occurs on the applied deposit surface, proximate to and beyond the beginning of the spacer loop.

d. The spacer is allowed to harden.

e. The extremities or ends of the extruded spacer are cut as they are adjusted.

f. The applied deposit surface is eliminated or neutralized and the spacer whose path is diverted on the surface of the object is glued.

Steps (a) and (b) on one hand and/or steps (d) and (e) on the other can be reversed. Also, step (d) may occur after step (f).

This process makes it possible to perform most of the operations at the same time as the extrusion. This results in a significant reduction in the production cost of the glazing.

Two variations of the process in accordance with the invention are possible; in the first, the object is fixed and the extrusion head is mobile, so the applied deposit surface is preferably also fixed and associated with the support of the object. It is thus possible to deposit the spacer simultaneously on the edge of a plate such as the glazing and on at least one of its surfaces.

In the second variation, the object is moved while the extrusion head is held substantially immobile, in which case the applied deposit surface is placed upon the moving object.

Within the framework of the invention, the applied deposit surface may also be provided on a temporary surface associated with the object. In this case, the temporary surface is preferably an anti-adhesive film or layer which is placed directly on the surface of the object and upon which the spacer is applied.

The invention also proposes a device for performing the process, which comprises an extrusion head that extrudes a spacer and an object whose surfaces are moved relative to the extrusion head; an anti-adhesive deposit surface is applied, and it extends the surface of the object to enable a diverted spacer to be deposited when passing from the surface of the object to the applied surface.

In one variation, the applied surface is supported by the object itself, and in another variation the applied surface is outside of the object and continuous with the surface of the object on which the spacer is deposited.

The device in accordance with the invention allows adaptation to all methods of carrying out the process.

The figures and the description allow the operation of the invention and its advantages to be understood.

DETAILED DESCRIPTION OF THE INVENTION

The invention is part of the field of deposit methods that involve extruding a plastic spacer directly on the surface of an object. Originally developed to deposit an automobile glazing spacer to enable the glazing to be glued into the opening of a vehicle, the method has been extended to all sorts of objects. By the same token, the material that was originally used, which at one time was a single-component polyurethane, has been extended to other polymers, two-component polyurethanes, polyvinyl chlorides, and all types of thermoplastic elastomers, including alloys of isotactic polyolefin filled with EPDM monomer rubber, etc.

EP-B-121 481, EP-B-524 092, and EP-A-493 068 describe different methods for depositing those different materials on objects. When the spacer is deposited in the form of a loop, in particular, a frame such as the self-centering elastomer frame in U.S. Pat. No. 5,057,265, the extrusion method alone does not make it possible to obtain the same form in the connection zone at the beginning and end of the extrusion, i.e., the same profile section as in the other parts of the spacer. The prior art devices simply cannot achieve the desired tolerances to precisely connect the tail of the spacer to the head.

Methods in the prior art suggested "correcting" the form of the zone, either immediately before or after hardening. In contrast, the present invention provides a properly formed spacer segment in a place proximate to the connection zone. This spacer is allowed to harden, and then is reinserted at the chosen location. This method requires only one relative movement of the glazing and the extrusion head, no matter which one of them is mobile in relation to the other. It is also equally suitable, regardless of where the spacer is applied, i.e., whether the spacer is deposited on a single surface of the object, on the surface and edge of a plate, or on both surfaces and its edge.

Figure 1:
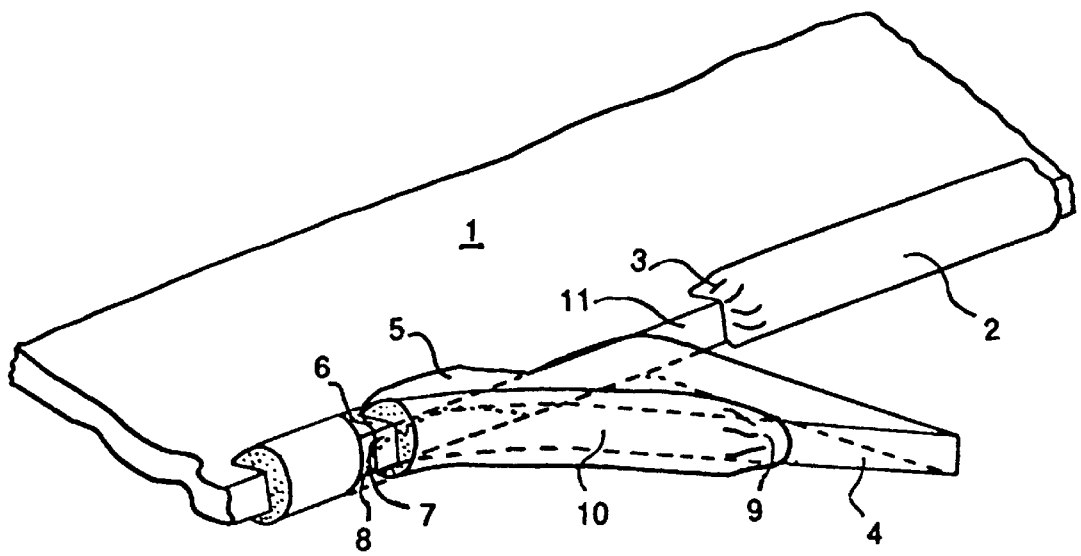
FIG. 1 shows a spacer deposited in accordance with the invention where the object is the glazing and is fixed, while the extrusion head is mobile
Figure 2:
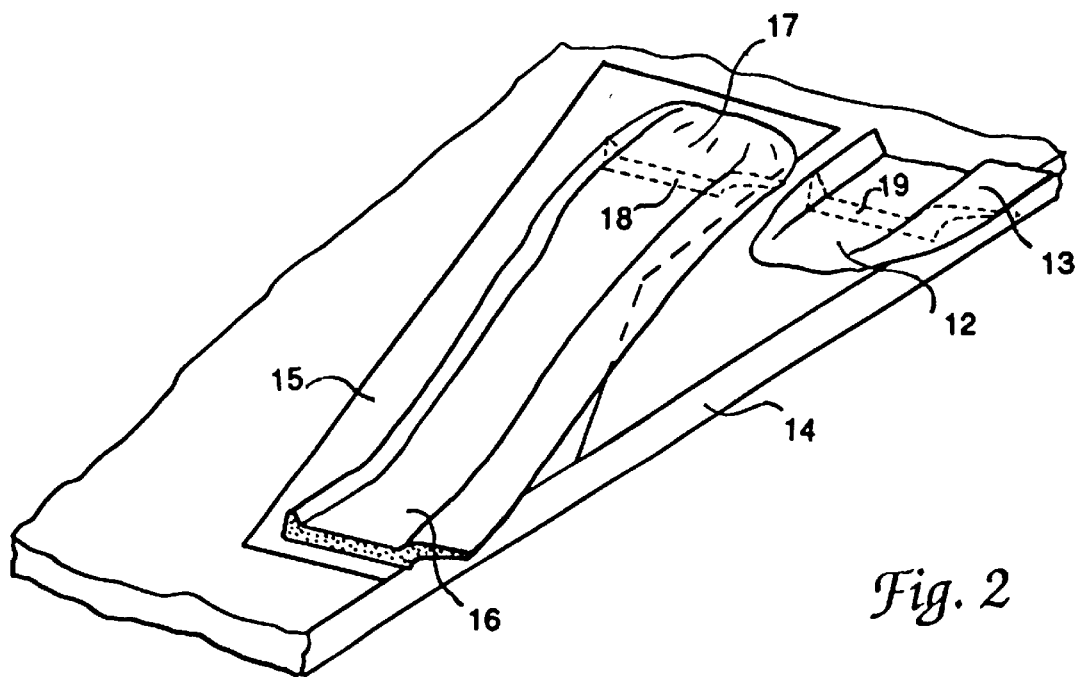
FIG. 2 shows a mobile glazing with a fixed extrusion head.

FIG. 1 represents a plate with a spacer running along its edge on three sides, and the extrusion method is the one with a fixed glazing and a mobile extrusion head, while FIG. 2, in contrast, shows a self-centering glazing spacer deposited on a single surface by a fixed nozzle in front of which the glazing moves. However, the invention is not limited to these two types of combinations, and can also apply to a fixed plate and deposit only on one surface or to a mobile plate and simultaneous deposit on one or both surfaces and the edge.

FIG. 1 shows a plate 1, in this case an automobile glazing intended to be fit into the windshield opening of a vehicle. The glazing is provided on its edge and its surfaces by an elastomer molding spacer 2 that runs along the edge of the glazing. At the time of installation into the automobile, an adhesive bead will be deposited proximate to the molding spacer 2 to secure the glazing to the sheet metal of the opening.

In FIG. 1, reference 3 indicates the beginning of extrusion. In that zone the spacer is poorly formed for several millimeters because the extrusion nozzle is not supplied instantaneously with spacer material. When starting the process, the flow of viscous material must increase from zero to its rated value, and this cannot be done without some small delay. At the end of the extrusion, the phenomenon is symmetrical, as a certain amount of time is required for the flow of hardenable material to stop. The spacer at the end of extrusion, therefore, also has an indefinite form for several millimeters, analogous to that of the beginning 3. If no precautions are taken when a spacer is being deposited in a loop, the end-beginning connection zone of the extrusion will be misshaped and unsatisfactory for use.

In FIG. 1, the method used to deposit the spacer 2 on the glazing 1 is the one in which the object is immobile and the extrusion head is mobile, generally moved by a robot. The device in accordance with the invention is shown as 4, which in this case is a platform that comprises an applied anti-adhesive deposit surface. It is a platform 4 of the same thickness as the glazing 1. It comprises an extension 5 in the form of a gutter (6, 7, 8) that covers the two surfaces and the edge of the glazing but is also as thin as possible while still providing satisfactory mechanical strength. Platform 4 is either made of a material that limits adhesion or coated with a layer that is anti-adhesive in relation to the viscous material that, once hardened, will form spacer 2.

The platform with the applied anti-adhesive deposit surface is associated with glazing 1 and forms a diversion track on which the extrusion will end. After having run along the narrow edge of the glazing, the extrusion head moves away from it, following the platform 4. Extrusion of the spacer then stops and the spacer also ends with a poorly-formed zone 9. Platform 4 is associated with the glazing 1 in two different ways depending on whether the glazing or the extrusion head moves.

If the glazing 1 is fixed during extrusion, then the platform 4 is preferably associated with the support of the glazing and, at the time it is put into place before extrusion begins, the glazing is placed in contact with the platform 4, with its three surfaces in contact with the interior surfaces of the gutter 6, 7, 8. If the glazing is mobile, then platform 4 is connected to it, for example, by means of the suction support connecting the glazing to the "hand" of the robot that is responsible for guiding it by causing its edge to pass before the extrusion head. FIG. 1 relates to the case of the mobile extrusion head, and the assembly comprised of the glazing 1 and the platform 4 is easier to keep together during deposition.

After hardening of the spacer 2, platform 4 is separated from the glazing 1 and the leg of the spacer 10 that was extruded outside of the glazing is freed. It is then presented on glazing edge 11 and the misshaped parts 3 and 9 are cut. The location of the cut on the two legs is such that, after cleaning part 3 of the beginning of the spacer, the two elements, the beginning and end of the extrusion, connect without any clearance. Once that adjustment has been completed, the only thing that remains to be done is to glue leg 10 on edge 11 of the glass after coating it with an appropriate glue.

FIG. 2 shows a closely-related method that is particularly adapted to the case where the spacer is deposited only on one surface of the object without extending to another side.

Spacer 13 is the one described in U.S. Pat. No. 5,057,265. It comprises two parts, one in the form of a channel glued onto the edge of glazing 14 which is intended to receive the adhesive bead for installation, and the other forms a lip that extends beyond the periphery of the glazing, which is used for automatic centering of the glazing in the opening of the car body.

At the beginning of the extrusion of the spacer 13, for the same reasons as described above, the extremity 12 of the spacer does not have the desired form. The method proposed by the invention also involves diverting the spacer at the end of extrusion but, instead of doing so outside of the glazing, its surface has been prepared so that extrusion can be done inside its perimeter. The diversion here is therefore, toward the interior.

Preparation of the surface, which is preferably done before beginning the extrusion, consists of depositing an anti-adhesive film 15. For example, it may be a self-adhesive film of polyethylene or other thermoplastic materials. If it does not disrupt future use of the glazing, a non-removable coating, such as, for example, a silicone-based varnish, is also appropriate.

The spacer that followed the edge of the glazing until it arrived on the film 15 leaves the edge at 16 and continues to move away from it at an angle until the end of the extrusion, which also produces a misshaped extremity 17. As described above, that extremity will be cut at 18 at the same time as misshapen part 12 at the beginning of the extrusion is cut at 19. Depending on the case, the cut may be made when the product is still soft or after it has hardened. As soon as the cement segment 16 has sufficient hardness to be handled, the film 15 is removed where applicable and replacement segment 16 is glued up to cut 18 along the edge of glazing 14. Cut 18 then comes into contact with cut 19, providing complete continuity of the spacer.

The preceding description, where extrusion is terminated outside the object, does not comprise a limit to the invention, which also covers the symmetrical situation in which extrusion begins on an applied anti-adhesive deposit surface and ends directly on the object itself.

The method for finishing a molding extruded in a loop as described above also makes it possible to limit the operations performed when the object is corrected after the spacer hardens, which can be summarized as:

1. Removing the applied anti-adhesive deposit surface
2. Cutting the two extremities of the spacer
3. Cleaning (scraping) the beginning zone
4. Gluing the final extremity The final result is of excellent quality, and the cost of the operation is lower compared with the connection methods that are known and used in the art.

What is claimed is:

1. A method for finishing the extrusion deposit of a spacer which is applied to a window glazing in which an extrusion head moves relative to the surface of the glazing and deposits the spacer in the form of a loop, which comprises:

extruding the spacer onto the glazing along a path from a beginning point to an end point proximate to but extending beyond the beginning point;

allowing the spacer to harden;

removing misshapen material at the beginning and end points of the extruded spacer; and aligning the beginning and end points of the spacer to complete the loop.

2. The method of claim 1 which further comprises extruding the end point of the spacer on an anti-adhesive deposit surface that is associated with the glazing.

3. The method of claim 2, wherein the glazing is fixed and the extrusion head is mobile and wherein the anti-adhesive deposit surface is also fixed and associated with the support of the glazing.

4. The method of claim 3, wherein the spacer is deposited simultaneously on the edge of the glazing and on at least one of its surfaces.

5. The method of claim 2 wherein the anti-adhesive deposit surface is part of a temporary structure that is associated with an edge of the glazing and upon which the end point of the spacer is deposited.

6. The method of claim 5 which further comprises removing the temporary structure after the end point of the spacer has hardened but before completing the loop.

7. The method of claim 2, wherein the anti-adhesive deposit surface receives part of the extrusion deposit of the spacer thereon and the part is hardened before final positioning of the hardened part on the glazing to complete the loop.

8. The method of claim 2, wherein the glazing is mobile, the extrusion head is substantially immobile and the anti-adhesive deposit surface is supported by the glazing.

9. The method of claim 8, wherein the anti-adhesive deposit surface is a film or coating.

10. The method of claim 2, further comprising removing the anti-adhesive deposit surface after the end point of the spacer has hardened but before completing the loop.

11. The method of claim 1, which further comprises gluing the end point of the spacer to the glazing after aligning the beginning and end points.

12. The method of claim 1 wherein the spacer is applied to the periphery of the glazing.

13. The method of claim 1 wherein the beginning point of the spacer is extruded onto an anti-adhesive deposit surface that is associated with the glazing.

14. The method of claim 13, wherein the anti-adhesive deposit surface is obtained by placing a film on the surface of the glazing.

15. The method of claim 13, wherein the anti-adhesive deposit surface is obtained by associating a structure with an edge of the glazing.

16. The method of claim 1, wherein the beginning and end points of the spacer are aligned before the spacer is allowed to harden.

17. The method of claim 1, wherein the end point of the spacer is deposited at an angle with respect to the beginning point of the spacer, and the beginning and end points of the spacer are cut to remove misshapen material before alignment to complete the loop.

* * * * *

UNITED STATES PATENT AND TRADEMARK OFFICE
CERTIFICATE OF CORRECTION

| | | |
|---|---|---|
| PATENT NO. | : | 6,113,727 |
| DATED | : | September 5, 2000 |
| INVENTOR | : | Cornils |

It is certified that error appears in the above-identified patent and that said Letters Patent is hereby corrected as shown below:

Column 6, line 10 (claim 5, line 3): change "an edge" to --the edge--.

Column 6, line 40 (claim 15, line 2): change "an edge" to --the edge--.

Signed and Sealed this

Eighth Day of May, 2001

Attest:

NICHOLAS P. GODICI

*Attesting Officer*     Acting Director of the United States Patent and Trademark Office